INVENTOR.
EDWARD L. PETERSON
BY P. E. Henninger
ATTORNEY

INVENTOR.
EDWARD L. PETERSON
BY P. E. Henninger
ATTORNEY 2,878,398
Patented Mar. 17, 1959

2,878,398

ELECTRIC CIRCUITS INCLUDING TRANSISTORS

Edward L. Peterson, Jr., Ossining, N. Y., assignor to International Business Machines Corporation, New York, N. Y., a corporation of New York Application December 31, 1953, Serial No. 401,567
1 Claim. (Cl. 307—88.5)

This invention relates to transistor circuits, particularly to power amplifier and impedance matching circuits or stages.

The input variational impedance of a conventional transistor circuit or stage varies non-linearly with the input potential.

Variational impedance may be defined as the differential rate of change of potential per unit change of current. Typically, the variational impedance may vary with input potential from a negative value to a positive value through an intermediate range of input potentials where the variational impedance is substantially infinite. This infinite impedance range is very useful in power amplifier and impedance matching stages, since a circuit operated in that range has a constant loading effect on the preceding stage. However, in typical circuits, this high impedance is obtained only over a very small range of input potential, so that it can be used only for very small signals. Moreover, the range of input potentials in which this high impedance is obtained may shift because of the inherent instabilities of present transistors. Such a shift may cause the circuit to appear as either a low positive or low negative variational impedance load on the preceding stage. In that event, it either loads down the circuit, or in the case of a negative impedance, tends to start an oscillation.

It has been suggested that the range of input potentials characterized by infinite variational impedance may be widened by connecting a resistor across the input terminals, thereby making the total input impedance the sum of the transistor impedance and the resistor impedance. If the resistor is chosen to balance the negative input resistance of the transistor then throughout the region where that balance is effected, the total variational input impedance will appear infinite.

However, since the slope of the negative impedance region is not constant, it is impossible to balance it with a linear resistor over any substantial proportion of its length. Consequently, such circuits have been limited as to the range of permissible variation of input potentials.

It has now been discovered that it is possible to arrange a transistor with a load resistor in its collector circuit which will, over a certain range of input potentials, give a constant input current, and hence an infinite variational input impedance. However if a circuit is arranged with a simple load resistor to give that effect outside the region of saturation of the transistor, then the circuit will not give that effect in the saturation region.

It has been further discovered that a composite load may be arranged for the collector circuit of a transistor, including a properly biased and connected asymmetric impedance unit, which provides different effective impedance loads at different operating ranges. It has been still further discovered that such a composite load may be arranged to give a substantially constant input current both without and within the region of transistor saturation.

An object of the present invention is to provide an improved transistor circuit for use with large input signals.

Another object is to provide a transistor circuit having a wide range of input potentials within which the input current is substantially constant.

Another object of the invention is to provide a transistor circuit having different effective impedance loads at different operating ranges.

The foregoing and other objects of the invention are attained in the circuit described herein by selecting a load resistor and a bias battery of values such that a portion of their load line drawn in the collector potential-current plane of the transistor substantially coincides with a portion of a line drawn through points in that plane where the input current is constant. Such a constant input current line commonly takes the form of two substantially linear portions connected by a sharply curved portion. The load line corresponding to the load resistor and bias battery selected as described above coincides with one of those linear portions. An asymmetric impedance unit or diode is connected in series with a battery to form a branch circuit and the branch is connected in parallel with the conventional load resistor and its battery in such a manner that the asymmetric impedance unit conducts current only at low collector potentials. By properly selecting the impedance of the asymmetric unit and the potential of its associated battery, the total load line, which represents the sum of the resistor load line and the asymmetric unit load line, may be made to coincide with the constant input current line.

A transistor circuit having a load so designed, i. e., a branch circuit including a load resistor in series with a battery and in parallel with a second branch circuit comprising an asymmetric unit and another battery, has, if the impedances and batteries are properly selected, a wide high input impedance region, that is to say, a wide range of input potentials over which the variational input impedance remains constant and substantially infinite.

Other objects and advantages of the invention will become apparent from a consideration of the following specification, taken together with the accompanying drawing.

Figure 1:
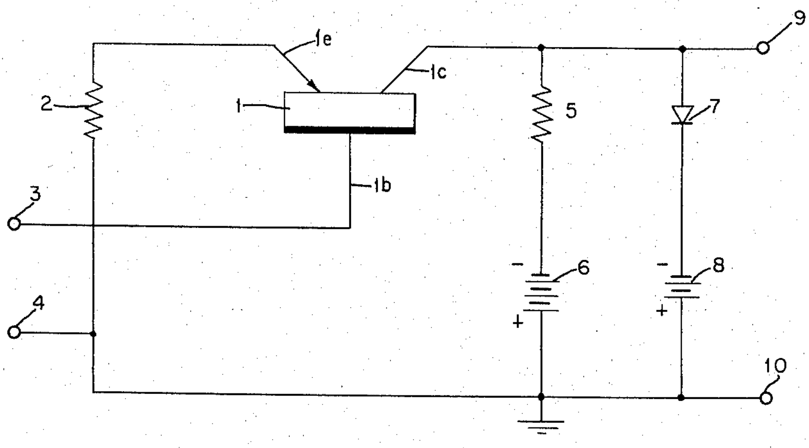
Fig. 1 is a wiring diagram of one form of transistor circuit embodying my invention.

Referring to Fig. 1, there is shown a transistor 1 having a base electrode 1*b*, a collector electrode 1*c* and an emitter electrode 1*e*. The emitter electrode 1*e* is connected to ground through a resistor 2. Input terminals 3 and 4 are connected respectively to the base 1*b* and to ground. Connected between the collector electrode 1*c* and ground are two parallel branch circuits. One of these branch circuits includes a load resistor 5 and a battery 6 in series. The other branch circuit includes an asymmetric impedance unit 7 and a battery 8 in series. Output terminals 9 and 10 are respectively connected to the collector electrode 1*c* and to ground.

The battery 8 has a smaller potential than the battery 6. The resistor 5 is chosen so that the potential drop across it when the transistor is in its "On" condition is greater than the difference between the potentials of the batteries 6 and 8. With the asymmetric unit 7 poled as shown in the drawing, the potential difference across the asymmetric unit in the "On" condition is in a direction to send a current through it in its low impedance direction.

When the transistor is "Off," the potential drop across resistor 5 is smaller than the difference between the potentials of the batteries 6 and 8, the potential difference across the asymmetric unit 7 is of the opposite polarity, and the flow of current through it is substantially prevented.

Figure 2:
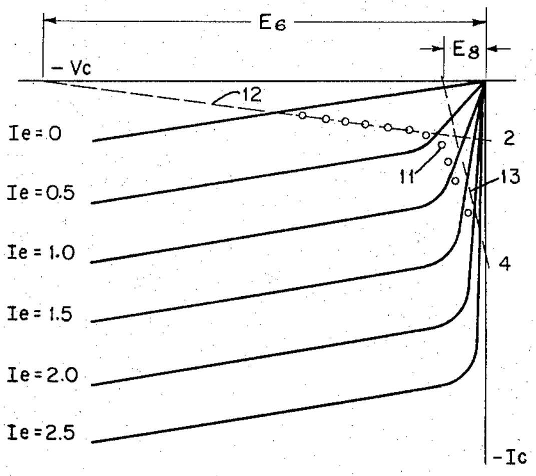
Fig. 2 is a graphical illustration of a family of collector current-potential characteristics for the circuit of Fig. 1.

Fig. 2 illustrates a family of collector current-potential characteristics for the transistor 1. Each curve in Fig. 2 is drawn for a fixed value of emitter current, exemplary values of which are indicated by legend in the drawing. There is superimposed on this family of curves a curve 11, represented in the drawing by a row of small circles. The curve 11 is drawn to represent a constant base current line. That is, for each point on the line 11, the algebraic sum of the corresponding values of collector current and of emitter current is the same. It will readily be recognized that a whole family of such constant base current lines may be drawn, one for each different value of constant current. It may be seen that the line 11 comprises two substantially straight portions connected by a relatively sharp bend, the sharp bend being located at the edge of the saturation region. The characteristics of the transistor 1 are illustrated in Fig. 2 by means of a family of constant emitter current curves rather than constant base current curves, simply because the constant emitter current curves have become conventionally accepted as a means of illustrating transistor characteristics.

If a transistor having the family of characteristic curves illustrated in Fig. 2 is connected in a specific circuit, the locus of all the possible operating points in the potential-current plane is defined by a line commonly termed a load line. When the only load is a linear resistor, such as resistor 5, the load line is straight and the impedance of the load determines the slope of the line. The location of the line may be determined by the fact that it passes through a point corresponding to zero collector current and a collector potential equal to the potential of the battery in the load circuit.

The line 12 in Fig. 2 represents the load line determined by resistor 5 and battery 6. By properly selecting the resistor 5 and the potential $E_6$ of battery 6, a substantial portion of the load line 12 is made to coincide with one of the substantially linear portions of the curve 11.

Line 13 in Fig. 2 represents a similar load line determined by the forward impedance of asymmetric unit 7 and the potential $E_8$ of battery 8.

Both of the two branch circuits which respectively include resistor 5 and asymmetric impedance unit 7 are continuously connected between the collector 1c and ground. Strictly speaking, therefore, the collector current for any value of collector potential is the sum of the currents through the two branches. However, by connecting the two branches in the manner shown, and by properly choosing the impedances of resistor 5 and of asymmetric unit 7 in relation to the potentials of the two batteries, the circuit may be arranged so that the potential across asymmetric unit 7 is in the reverse direction during the higher range of values of collector potentials and the current flow through the asymmetric unit 7 may then be neglected.

In order to secure this relationship, the following conditions must be met: battery 6 must have a higher potential than battery 8; the impedance of resistor 5 must be such that the potential drop across it is less than the difference between the two battery potentials when the collector potential is high and greater than the difference between the two battery potentials when the collector potential is low; the forward impedance of asymmetric unit 7 must be substantially lower than the impedance of resistor 5, and its reverse impedance substantially higher.

If the foregoing conditions are met, then when the collector potential is high, the collector 1c is more negative than the negative terminal of battery 8, and consequently the potential across asymmetric unit 7 is in the reverse direction, so that the current flow through it may be neglected.

As the collector potential decreases, a value of current is reached where the potential drop across resistor 5 just equals the difference of potential of the two batteries 6 and 8. The collector-to-ground potential is then equal to the potential of battery 8. There is then no potential across asymmetric unit 7 and no current flows through it. As the collector potential decreases beyond that value, the potential across the asymmetric unit 7 reverses in polarity, being then in the forward direction with respect to that unit. Further increments of collector current flow through that unit rather than through resistor 5 because of the lower impedance of the asymmetric unit.

The total load line for the circuit of Fig. 1, for collector potential values lower than $E_8$, would be correctly shown by a line drawn through ordinates representing the sums of the corresponding ordinates of curves 12 and 13. If asymmetric unit 7 and the potential of battery 8 are properly selected, that total load line may be made to coincide substantially with the right-hand linear portion of the curve 11.

Figure 3:
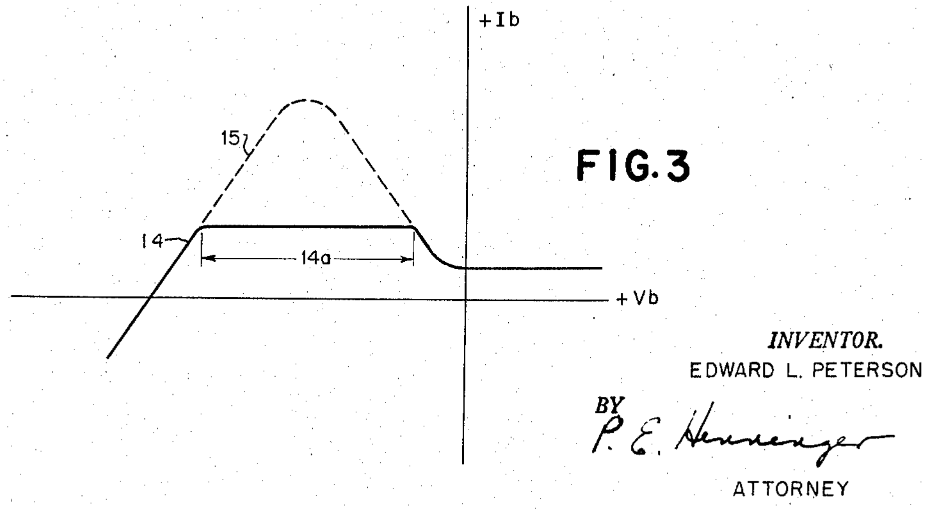
Fig. 3 is a graphical illustration of an input characteristic of the circuit of Fig. 1.

If the resistor 5, asymmetric unit 7 and the batteries 6 and 8 are selected as indicated in Fig. 2, then the input characteristic of this circuit will have a form illustrated by the curve 14 in Fig. 3, including a substantial range 14*a*, where the input or base current $I_b$ is constant over a wide range of base potentials $V_b$, and the variational impedance is substantially infinite.

The dotted line 15 in Fig. 3, shows, for purpose of comparison, the appearance of the corresponding input characteristic of a conventional transistor circuit.

Figure 4:
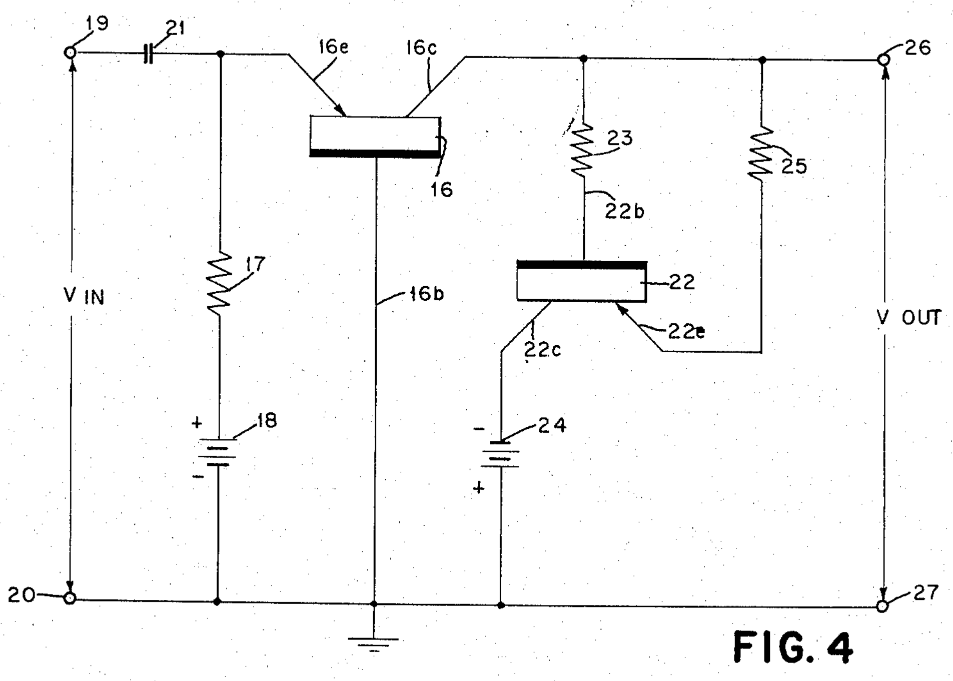
Fig. 4 is a wiring diagram of a modified form of circuit embodying the invention.
Figure 5:
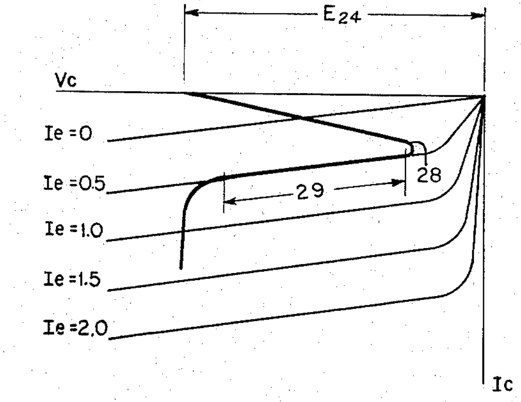
Fig. 5 is a graphical illustration of a family of collector current-potential characteristics for the circuit of Fig. 4.

*Figs. 4 and 5*

The invention has been described above as applied to a transistor having a base input. It is also applicable to transistors having emitter inputs. Fig. 4 illustrates such a circuit, and Fig. 5 illustrates graphically the collector current-potential characteristics of the circuit of Fig. 4, with a superimposed load line.

Referring to Fig. 4, there is shown a transistor 16 having an emitter electrode 16*e*, a collector electrode 16*c* and a base electrode 16*b*. The emitter 16*e* is connected to the grounded base 16*b* through a resistor 17 and a biasing battery 18. A pair of input terminals 19 and 20 are provided, the input terminal 19 being connected through a capacitor 21 to the emitter electrode 16*e* and the input terminal 20 being connected directly to the grounded base 16*b*.

Each curve in the family of collector potential current characteristics appearing in Fig. 5 is drawn for a constant value of emitter current. In the circuit of Fig. 4, the emitter current and the input current are the same. Consequently, if the characteristics of the load impedance are to be chosen to provide constant emitter current over a wide range of input signal potentials, then the collector load impedance must be selected so that the load line will follow one of the constant emitter current lines. Since the slope of the constant emitter current lines is negative, the load impedance to be connected to the collector must have a negative impedance, at least over a substantial range of collector potentials. The circuit of Fig. 4 has therefore been provided with a negative impedance load, comprising a transistor 22. Transistor 22 has an emitter electrode 22*e*, a collector electrode 22*c* and a base electrode 22*b*.

The load circuit for transistor 16 may be traced from the collector 16*c* through a resistor 23, base electrde 22*b*, collector electrode 22*c*, and a battery 24 to the grounded base 16*b*. Emitter 22*e* is connected through a resistor 25 to collector 16*c*. Output terminals 26 and 27 are respctively connected to collector 16*c* and to the grounded base 16*b*.

A load line 28 is superimposed on the family of characteristic curves in Fig. 5. The intersection of load line 28 with the zero collector current line is determined by the potential of battery 24. The contour of load line 28 is determined by the characteristics of transistor 22. It may be seen that the load line 28 coincides with the line of constant emitter current at 0.5 milliampere over a substantial range indicated at 29 in the drawing.

The parameters of the circuit of Fig. 4 are quite critical, and both transistors must be very stable for satisfactory operation.

The circuits and the methods of analysis described above may be utilized in connection with either of two different types of operation. One of these types is small signal operation where it is desired to have the output vary linearly with the input signal. In this case, referring to the circuit of Fig. 1, the selection of a collector load resistor and bias battery so that their load line corresponds to a constant base current line in the collector plane gives optimum results. The parallel branch circuit including diode 7 and battery 8 in the diagram of Fig. 1 is not required for this type of operation and may be omitted.

The other type of operation in which the circuit is useful is large signal operation where the transistor is driven into the region of saturation. The parallel branch circuit including diode 7 and battery 8 is then used to prevent excessive loading of the signal generator connected to the input.

Any input wave form may be used, within the limitations imposed by the high frequency cut off of the particular transistor being used.

The circuits illustrated above are particularly useful as power amplifier circuits and as impedance matching circuits. In either type of application, a wide range of input potentials may be received at the input without changing the loading on the preceding stage. The output impedance of the circuit is quite low, which makes the circuit highly useful for connecting a high impedance output to a low impedance input.

While I have shown and described certain preferred embodiments of my invention, other modifications thereof will readily occur to those skilled in the art and I therefore intend my invention to be limited only by the appended claim.

I claim:

An electric signal-translating circuit for large signal operation, comprising a transistor having base, emitter and collector electrodes, a signal input circuit connected between the base and emitter electrodes and including a large signal source, and two parallel branch load circuits direct-current conductively connected between the collector and base electrodes, one of the parallel branch circuits consisting of a resistor and a first source of unidirectional electrical energy in series, the other of the parallel branch circuits consisting of a semi-conductive diode and a second source of unidirectional electrical energy in series, said second source having a potential smaller than said first source, said diode being connected directly to the collector electrode, both said sources being poled to bias the collector electrode reversely with respect to the base electrode, said diode being poled forwardly to current from said second source, and means for taking an output between said collector and base electrodes.

References Cited in the file of this patent

UNITED STATES PATENTS

| | | |
|---|---|---|
| 2,594,336 | Mohr | Apr. 29, 1952 |
| 2,629,833 | Trent | Feb. 24, 1953 |
| 2,644,897 | Lo | July 7, 1953 |
| 2,665,845 | Trent | Jan. 12, 1954 |
| 2,670,445 | Felker | Feb. 23, 1954 |
| 2,693,568 | Chase | Nov. 2, 1954 |
| 2,718,613 | Harris | Sept. 20, 1955 |
| 2,730,576 | Caruthers | Jan. 10, 1956 |

OTHER REFERENCES

Sulzer: "Junction Transistor Circuit Applications," Electronics, August 1953, pages 170–173.

Williams et al.: A Method of Design Transistor Trigger Circuits (publication), published January 1953, Conference report June 6, 1952 in Institution of Electrical Engineer, vol. 1, part 3, 1953, pages 228–248.

Seeley, Book: Electron Tube Circuits, published 1950, McGraw-Hill Publishing Co., New York, pages 123–126, 136. (Div. 51.)